US011057534B2

(12) United States Patent
Sasaki

(10) Patent No.: US 11,057,534 B2
(45) Date of Patent: Jul. 6, 2021

(54) INFORMATION PROCESSING APPARATUS, AND METHOD OF CONTROLLING INFORMATION PROCESSING APPARATUS FOR PROVIDING NOTIFICATION OF A RECEPTION RESULT IN RESPONSE TO PREDETERMINED INFORMATION

(71) Applicant: CANON KABUSHIKI KAISHA, Tokyo (JP)

(72) Inventor: Hidemi Sasaki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/746,621

(22) Filed: Jan. 17, 2020

(65) Prior Publication Data

US 2020/0244828 A1 Jul. 30, 2020

(30) Foreign Application Priority Data

Jan. 24, 2019 (JP) ............................ JP2019-010155

(51) Int. Cl.
*G06F 3/12* (2006.01)
*H04N 1/00* (2006.01)

(52) U.S. Cl.
CPC ..... *H04N 1/00477* (2013.01); *H04N 1/00029* (2013.01); *H04N 1/0049* (2013.01); *H04N 1/00076* (2013.01); *H04N 1/00408* (2013.01); *H04N 1/00488* (2013.01)

(58) Field of Classification Search
None
See application file for complete search history.

(56) References Cited

U.S. PATENT DOCUMENTS 9,769,344 B2 * 9/2017 Hikichi .............. H04N 1/00395
2012/0300237 A1 * 11/2012 Yamamoto ......... H04N 1/00236 358/1.13
2013/0342863 A1 * 12/2013 Hikichi ............. H04N 1/00928 358/1.12
2014/0368855 A1 * 12/2014 Yamano ................ G06F 1/3231 358/1.13
2015/0277817 A1 * 10/2015 Tsujioka ............... G06F 3/1289 358/1.14

(Continued)

FOREIGN PATENT DOCUMENTS

JP 2016-218553 A 12/2016

*Primary Examiner* — Henok Shiferaw
(74) *Attorney, Agent, or Firm* — Canon U.S.A., Inc. IP Division

(57) ABSTRACT

An information processing apparatus includes a first substrate, a second substrate, a communication line configured to communicably connect the first substrate and the second substrate, wherein the first substrate transmits predetermined information to the second substrate via the communication line, and the second substrate transmits a response to the predetermined information to the first substrate via the communication line. The information processing apparatus further includes a first notification unit configured to provide a notification of a reception result of the predetermined information transmitted from the first substrate, and a second notification unit configured to provide a notification of a reception result of the response to the predetermined information that is transmitted from the second substrate.

15 Claims, 5 Drawing Sheets

(56) References Cited

U.S. PATENT DOCUMENTS

2016/0337530 A1* 11/2016 Kozuka .............. H04N 1/00899
2016/0352928 A1* 12/2016 Hashimoto ........ H04N 1/00084
2017/0353615 A1* 12/2017 Hasegawa ............. G06F 3/1285
2020/0252515 A1* 8/2020 Sasaki ...................... G09G 5/10

* cited by examiner

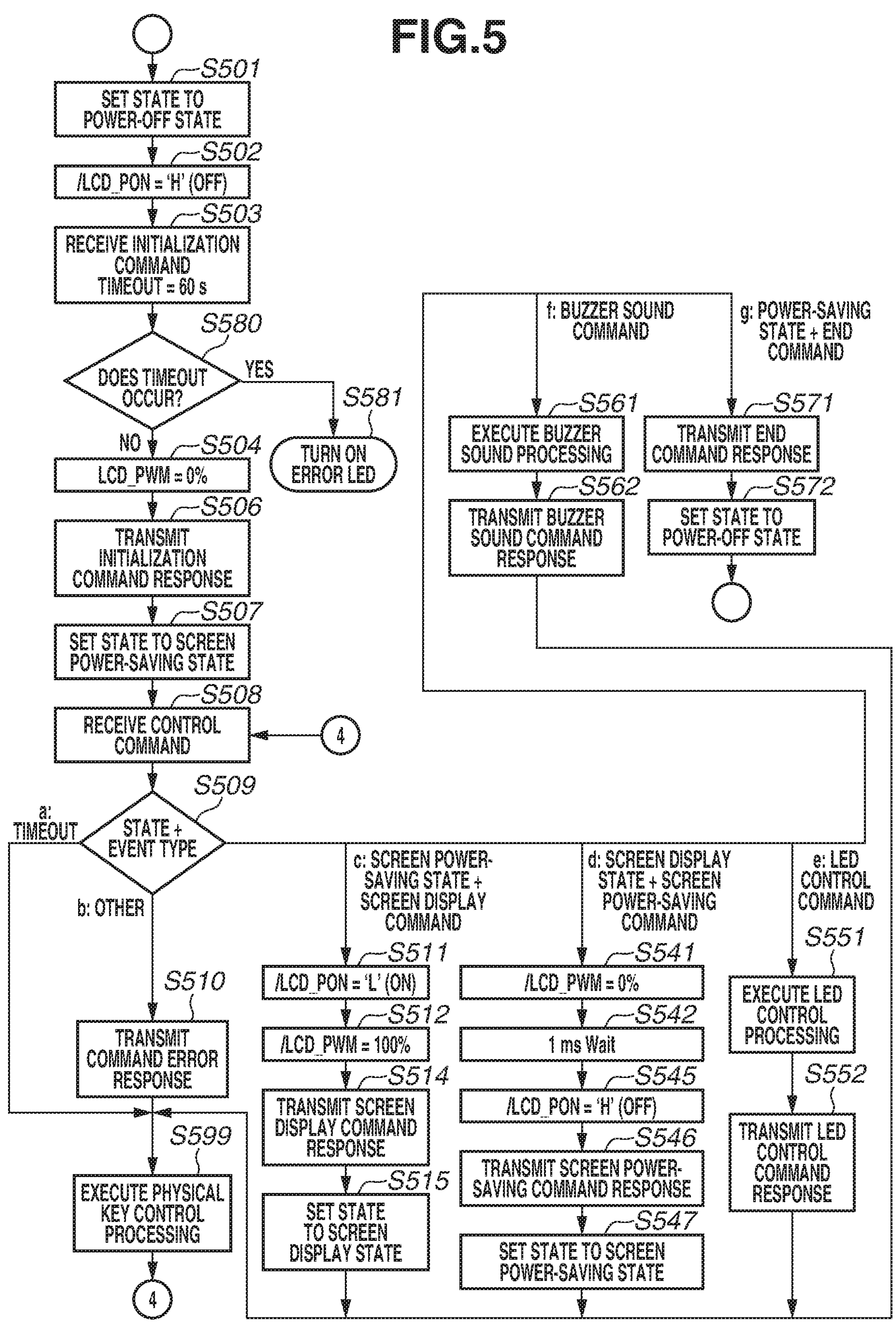
FIG.5
S501
SET STATE TO POWER-OFF STATE
S502
/LCD_PON = 'H' (OFF)
S503
RECEIVE INITIALIZATION COMMAND TIMEOUT = 60 s
S580
DOES TIMEOUT OCCUR?
YES
S581
TURN ON ERROR LED
NO
S504
LCD_PWM = 0%
S506
TRANSMIT INITIALIZATION COMMAND RESPONSE
S507
SET STATE TO SCREEN POWER-SAVING STATE
S508
RECEIVE CONTROL COMMAND
4
S509
STATE + EVENT TYPE
a: TIMEOUT
b: OTHER
S510
TRANSMIT COMMAND ERROR RESPONSE
S599
EXECUTE PHYSICAL KEY CONTROL PROCESSING
4
c: SCREEN POWER-SAVING STATE + SCREEN DISPLAY COMMAND
S511
/LCD_PON = 'L' (ON)
S512
/LCD_PWM = 100%
S514
TRANSMIT SCREEN DISPLAY COMMAND RESPONSE
S515
SET STATE TO SCREEN DISPLAY STATE
d: SCREEN DISPLAY STATE + SCREEN POWER-SAVING COMMAND
S541
/LCD_PWM = 0%
S542
1 ms Wait
S545
/LCD_PON = 'H' (OFF)
S546
TRANSMIT SCREEN POWER-SAVING COMMAND RESPONSE
S547
SET STATE TO SCREEN POWER-SAVING STATE
e: LED CONTROL COMMAND
S551
EXECUTE LED CONTROL PROCESSING
S552
TRANSMIT LED CONTROL COMMAND RESPONSE
f: BUZZER SOUND COMMAND
S561
EXECUTE BUZZER SOUND PROCESSING
S562
TRANSMIT BUZZER SOUND COMMAND RESPONSE
g: POWER-SAVING STATE + END COMMAND
S571
TRANSMIT END COMMAND RESPONSE
S572
SET STATE TO POWER-OFF STATE

INFORMATION PROCESSING APPARATUS, AND METHOD OF CONTROLLING INFORMATION PROCESSING APPARATUS FOR PROVIDING NOTIFICATION OF A RECEPTION RESULT IN RESPONSE TO PREDETERMINED INFORMATION

BACKGROUND

Field

The present disclosure relates to an image forming apparatus that includes a controller board and an operation unit board, and a method of controlling the image forming apparatus.

Description of the Related Art

There are conventional image forming apparatuses that include a controller board and an operation unit board connected to the controller board. The controller board is a control substrate that includes a central processing unit (CPU) configured to control image forming on a physical medium. Further, the operation unit board is a control substrate that includes operation units, such as a liquid crystal display (LCD) panel, a buzzer, a light emitting diode (LED), and a physical key, and a dedicated CPU configured to control the above operation units.

The operation unit board is used to inform a service engineer or a user of state information about the image forming apparatus and to receive an operation from the service engineer or the user and transmit operation information to the image forming apparatus.

Especially an important function of the operation unit board is to inform the service engineer of malfunction information as appropriate when the image forming apparatus malfunctions. For example, Japanese Patent Application Laid-Open No. 2016-218553 discusses an image printing apparatus that includes a controller unit provided with a self-diagnosis unit configured to detect a portion where an abnormality has occurred, and when an abnormality is detected, the controller unit notifies the operation unit of the occurrence of the abnormality.

SUMMARY

It has now been determined that in the image forming apparatus that includes the self-diagnosis unit configured to detect a malfunction, if the self-diagnosis unit is implemented as software, function scalability and applicability can be enhanced. However, if the self-diagnosis unit does not operate normally, malfunctions cannot be detected by conventional means.

Thus, in the case where the self-diagnosis unit is implemented as software, many hardware components, such as a memory and a storage that stores a program, need to be operating normally. Further, if the controller board and the operation unit board fail to normally communicate with each other, it is not possible to inform the service engineer of the malfunction.

To overcome the above-described issue, dedicated hardware configured to detect a malfunction and inform the service engineer of the detected malfunction can be implemented as an alternative unit separately from the controller board. Such dedicated hardware provided separately from the controller board can inform the service engineer of the malfunction regardless of the state of the controller board. However, adding new hardware produces a disadvantage that increases the costs of the image forming apparatus.

The present disclosure features an image forming apparatus that detects a malfunction that has occurred in a portion of a controller board or in communication/control between the controller board and an operation unit board without adding new hardware while a self-diagnosis unit is implemented as software.

According to an aspect of the present disclosure, an information processing apparatus includes a first substrate, a second substrate, a communication line configured to communicably connect the first substrate and the second substrate, wherein the first substrate transmits predetermined information to the second substrate via the communication line, and the second substrate transmits a response to the predetermined information to the first substrate via the communication line. The information processing apparatus further includes a first notification unit configured to provide a notification of a reception result of the predetermined information transmitted from the first substrate, and a second notification unit configured to provide a notification of a reception result of the response to the predetermined information that is transmitted from the second substrate.

Further features of the present disclosure will become apparent from the following description of exemplary embodiments with reference to the attached drawings.

BRIEF DESCRIPTION OF THE DRAWINGS

FIG. 5 is a flowchart illustrating a process that is executed by an operation unit control unit.

DESCRIPTION OF THE EMBODIMENTS

Exemplary embodiments of the present disclosure will be described below with reference to the drawings. It should be noted that the below-described exemplary embodiments are not intended to limit the scope of the claimed invention and that not every combination of features described in the exemplary embodiments is always essential to a technical solution of the invention.

Figure 1:
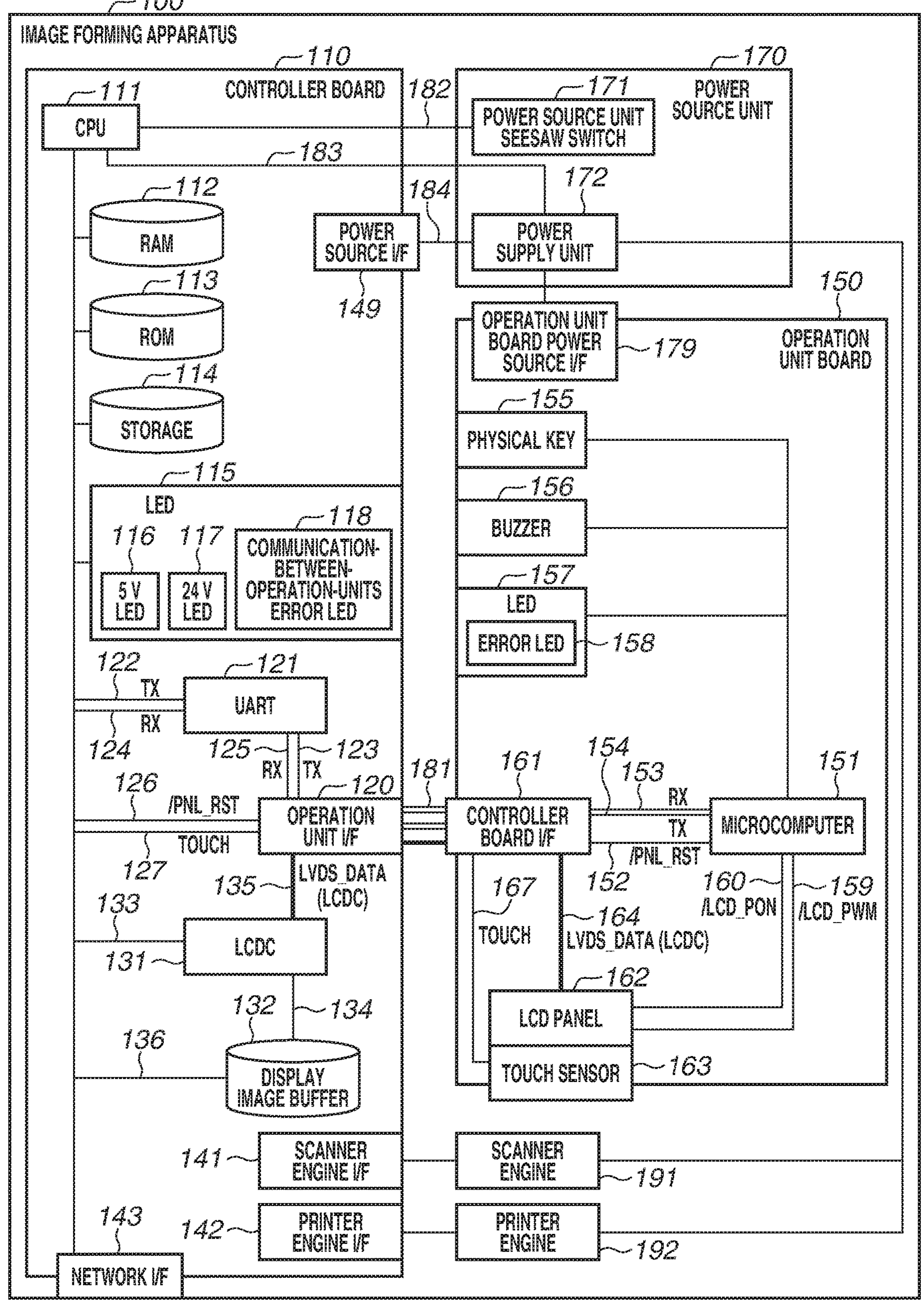
FIG. 1 illustrates a hardware configuration of an image forming apparatus.

A first exemplary embodiment will be described below. FIG. 1 illustrates a hardware configuration of an image forming apparatus 100 according to an exemplary embodiment of the present disclosure.

The image forming apparatus 100 includes a controller board 110, an operation unit board 150, a power source unit 170, a scanner engine 191, and a printer engine 192.

The controller board 110 is a control substrate that performs control for execution of various functions of the image forming apparatus 100, such as a print function and a scan function. The operation unit board 150 is a control substrate that receives an operation on the image forming apparatus 100 from a user and notifies the user of information from the image forming apparatus 100.

The printer engine 192 is a unit that prints print image data formed by the controller board 110 on a physical medium based on a request from the controller board 110.

The scanner engine 191 is a unit that transmits read image data acquired by reading the image on the physical medium supplied to the image forming apparatus 100 to the controller board 110 based on a request from the controller board 110.

The power source unit 170 supplies power to the controller board 110, the operation unit board 150, the scanner engine 191, and the printer engine 192.

The controller board 110 and the operation unit board 150 are connected to each other by a communication bundle line 181 and can transmit and receive information to and from each other. In the present exemplary embodiment, the communication bundle line 181 includes the following five types of signal lines.

(1) A transmitter-receiver (TX-RX) signal line configured to connect a universal asynchronous receiver-transmitter (UART) transmission line (TX) 123 and a UART reception line (RX) 153.

The TX-RX signal line is a signal line via which the controller board 110 transmits a control command and the operation unit board 150 receives the control command. Further, the TX-RX signal line also serves as a signal line via which the controller board 110 transmits a control command response and the operation unit board 150 receives the control command response.

(2) A receiver-transmitter (RX-TX) signal line configured to connect a UART reception line (RX) 125 and a UART transmission line (TX) 154.

The RX-TX signal line is a signal line via which the operation unit board 150 transmits a control command and the controller board 110 receives the control command. Further, the RX-TX signal line also serves as a signal line via which the operation unit board 150 transmits a control command response and the controller board 110 receives the control command response.

(3) A display image data signal line configured to connect a display image data signal line (LVDS_DATA(LCDC)) 135 and a display image data signal line (LVDS_DATA(LCDC)) 164.

(4) A reset signal line configured to connect a reset signal line (/PNL_RST) 126 and a reset signal line (/PNL_RST) 152.

(5) A touch sensor signal line configured to connect a touch sensor signal line (TOUCH) 127 and a touch sensor signal line (TOUCH) 167.

In the present exemplary embodiment, the signal lines on the controller board 110 and the signal lines on the operation unit board 150 are electrically connected. Further, the same signal can substantially simultaneously flow on some of the signal lines.

For example, display image data flows on the display image data signal line (LVDS_DATA(LCDC)) 135 and the display image data signal line (LVDS_DATA(LCDC)) 164. The reset signal flows on the reset signal line (/PNL_RST) 126 and the reset signal line (/PNL_RST) 152. The touch sensor signal flows on the touch sensor signal line (TOUCH) 127 and the touch sensor signal line (TOUCH) 167.

To simplify the description, the present exemplary embodiment will be described using the same identifiers as necessary.

The power source unit 170 and the controller board 110 are connected by a seesaw switch signal line 182, a power control line 183, and a power line 184.

If a power source unit seesaw switch 171 is pressed, this event is transmitted as an operation event from the power source unit 170 to the controller board 110 via the seesaw switch signal line 182. The power control line 183 is a signal line via which the controller board 110 controls the supply of power to the operation unit board 150, the scanner engine 191, and the printer engine 192. The power line 184 is a signal line for supplying power from the power source unit 170 to the controller board 110.

A signal line is provided between the controller board 110 and the scanner engine 191 to transmit and receive information to and from each other, and another signal line is provided between the controller board 110 and the printer engine 192 to transmit and receive information to and from each other.

Next, details of the controller board 110 will be described below.

The controller board 110 includes a central processing unit (CPU) 111, a random access memory (RAM) 112, a read-only memory (ROM) 113, a storage 114, and a light emitting diode (LED) 115 as hardware components. Further, the controller board 110 includes an operation unit interface (I/F) 120, a UART 121, a liquid crystal display (LCD) controller (LCDC) 131, and a display image buffer 132. The controller board 110 further includes a scanner engine I/F 141, a printer engine I/F 142, a network I/F 143, and a power source I/F 149.

The CPU 111 is a central processing unit configured to realize the functions of the image forming apparatus 100. For example, the CPU 111 stores display image data displayed on an LCD panel 162 on the operation unit board 150 on the RAM 112. Further, the CPU 111 performs various types of data compression processing and/or file format conversion as needed on read image data read from the physical medium by the scanner engine 191 and thereafter stores the resulting image data on the storage 114. Further, the CPU 111 stores print image data to be printed on a physical medium using the printer engine 192 on the RAM 112.

The RAM 112 is a volatile storage area for temporarily storing information when the CPU 111 executes a program.

The ROM 113 is a non-volatile storage area for storing an initialization program 200 for execution of initialization processing by the CPU 111 when the user turns on the image forming apparatus 100.

The storage 114 is a non-volatile storage area for storing a main program 220 for realization of the functions as an image forming apparatus by the CPU 111. Further, the storage 114 is also a non-volatile storage area for storing a result of processing performed by the CPU 111. Specifically, the storage 114 consists of a hard disk or a solid-state disk. Further, the storage 114 can consist of a plurality of storages.

The LED 115 is an informing unit via which the CPU 111 provides information about the image forming apparatus 100. For example, while power is supplied from the power source unit 170 to the controller board 110 via the power line 184, the CPU 111 may inform about the supply of power by keeping the LED 115 turned on.

In the present exemplary embodiment, the LED 115 includes a LED (5 V) 116 and a LED (24 V) 117. The LED (5 V) 116 provides information that 5 V power is supplied. The LED (24 V) 117 provides information that 24 V power is supplied. The LED 115 further includes a communication-between-operation-units error LED 118 for providing information about an occurrence of an error in communication between the operation units.

The UART 121 receives data via the UART reception line (RX) 125 and the operation unit I/F 120. The UART 121 converts the received data according to communication protocols and transmits the converted data to the CPU 111 via a UART reception line (RX) 124.

As used herein, the phrase "conversion according to communication protocols" refers to, specifically, detection of data loss during communication and replenishment by addition and/or deletion of a data bit length, a parity bit, and/or a stop bit to data to be received and transmitted. The conversion processing according to communication protocols is within the range of publicly-known techniques for UART communication, so that detailed description thereof is omitted.

Examples of control commands that are transmitted via the UART 121 are shown in Table 1.

For example, the controller board 110 transmits 0X0001 as an initialization command to the operation unit board 150. After the operation unit board 150 receives the initialization command and processes the received initialization command, the operation unit board 150 transmits 0XFF01 as an initialization command response to the controller board 110.

The combination of the transmission of the control command and the reception of the control command response realizes communication between the controller board 110 and the operation unit board 150.

The control commands specified in Table 1 will be described below.

The initialization command is a command by which the controller board 110 requests the operation unit board 150 to perform initialization processing immediately after power is supplied to the operation unit board 150.

A screen display command is a command by which the controller board 110 requests the operation unit board 150 to display the display image data on the LCD panel 162.

A screen power-saving command is a command by which the controller board 110 requests the operation unit board 150 to stop displaying the display image data on the LCD panel 162.

An end command is a command by which the controller board 110 requests the operation unit board 150 to perform end processing immediately before the supply of power to the operation unit board 150 is stopped.

A LED turn-on command is a command by which the controller board 110 requests the operation unit board 150 to turn on a LED 157. In a case where the LED 157 consists of a plurality of LEDs, information (identifier) that specifies the position of each LED can be embedded in a portion of the command in order to control each LED separately.

A LED turn-off command is a command by which the controller board 110 requests the operation unit board 150 to turn off the LED 157. In the case where the LED 157 consists of a plurality of LEDs, information (identifier) that specifies the position of each LED can be embedded in a portion of the command in order to control each LED separately.

A buzzer sound command is a command by which the controller board 110 requests the operation unit board 150 to sound a buzzer 156.

A physical key press command is a command by which the operation unit board 150 notifies the controller board 110 that a physical key 155 is pressed. In a case where the physical key 155 consists of a plurality of physical keys, information (identifier) for identifying each physical key can be embedded in the command.

A displayable state notification command is a command by which the operation unit board 150 notifies the controller board 110 that display of the display image data on the LCD panel 162 is successfully started.

A command error response is a command response in a case where the controller board 110 receives a control command that is not expected in the current state.

TABLE 1

| | Transmission Source | Transmission Destination | Data | Definition |
|---|---|---|---|---|
| 1 | Controller | Operation Unit | 0x0001 | Initialization Command |
| 2 | Operation Unit | Controller | 0xFF01 | Initialization Command Response |
| 3 | Controller | Operation Unit | 0x0002 | Screen Display Command |
| 4 | Operation Unit | Controller | 0xFF02 | Screen Display Command Response |
| 5 | Controller | Operation Unit | 0x0003 | Screen Power-Saving Command |
| 6 | Operation Unit | Controller | 0xFF03 | Screen Power-Saving Command Response |
| 7 | Controller | Operation Unit | 0x00FF | End Command |
| 8 | Operation Unit | Controller | 0xFFFF | End Command Response |
| 9 | Controller | Operation Unit | 0x00AX | LED Turn-On Command (XX = Position) |
| 10 | Operation Unit | Controller | 0xFFAX | LED Turn-On Command Response |
| 11 | Controller | Operation Unit | 0x00BX | LED Turn-Off Command (XX = Position) |
| 12 | Operation Unit | Controller | 0xFFBX | LED Turn-Off Command Response |
| 13 | Controller | Operation Unit | 0x00C0 | Buzzer Sound Command |
| 14 | Operation Unit | Controller | 0xFFC0 | Buzzer Sound Command Response |
| 15 | Operation Unit | Controller | 0x02XX | Physical Key Press Command (XX = Position) |
| 16 | Controller | Operation Unit | 0xFDXX | Physical Key Press Command Response |
| 17 | Operation Unit | Controller | 0xAAAA | Command Error Response |

In the present exemplary embodiment, the example of commands in a communication form in which if a transmitter transmits one command, a receiver transmits one command response in response to the transmitted command is described. Alternatively, in the present disclosure, a command response can be omitted in a case where, for example, the transmitter does not have to recognize a result of command execution.

Further, the example of commands in a 16-bit fixed length form is described in the present exemplary embodiment. If there are many types of commands to be handled, the commands can be designed in a 32-bit fixed length form. Alternatively, the command length can be a variable length. In the present disclosure, the command form is not limited, and any form can freely be selected.

The description returns to the details of the controller board 110.

The LCDC 131 is a chip by which the CPU 111 transmits the display image data formed on the RAM 112 to the operation unit board 150. The LCDC 131 receives the display image data stored on the RAM 112 via a controller board LCDC control line 133. The LCDC 131 temporarily stores the received display image data on the display image buffer 132 via the display image data signal line 134. The LCDC 131 reads the display image data stored on the display image buffer 132 at preset time intervals via the display image data signal line 134. Further, the LCDC 131 transmits the read display image data to the operation unit board 150 via the display image data signal line (LVDS_DATA(LCDC)) 135 and the operation unit I/F 120.

The display image buffer 132 is a volatile storage area on which the LCDC 131 temporarily stores the display image data to be transmitted to the operation unit board 150. The CPU 111 controls a power source of the display image buffer 132 via a controller board display image buffer control line 136.

In the present exemplary embodiment, the controller board 110 includes the display image buffer 132 as a non-volatile storage area separately from the RAM 112. In an implementation of the present disclosure, the display image buffer 132 can be realized by, for example, allocating a portion of a memory on the RAM 112 as a display image buffer.

The scanner engine I/F 141 is an interface for issuing a control request to the scanner engine 191 and acquiring information from the scanner engine 191.

The printer engine I/F 142 is an interface for issuing a control request to the printer engine 192 and acquiring information from the printer engine 192.

The network I/F 143 is an interface via which the image forming apparatus 100 receives an instruction from an external apparatus connected to a network and provides information to the external apparatus. For example, the image forming apparatus 100 receives print data from an external host personal computer (PC) via the network I/F 143 and provides a notification of the state of the image forming apparatus 100 in a web page format in response to a request from the host PC.

The power source I/F 149 is an interface for receiving necessary power for operating the controller board 110 from the power source unit 170 via the power line 184.

Next, details of the operation unit board 150 will be described below.

The operation unit board 150 includes a microcomputer 151, the physical key 155, the buzzer 156, and the LED 157 as hardware components. Further, the operation unit board 150 includes a controller board I/F 161, the LCD panel 162, a touch sensor 163, and an operation unit board power source I/F 179.

The microcomputer 151 is a central processing unit configured to realize the functions of the operation unit board 150. In the present exemplary embodiment, the microcomputer 151 includes a non-volatile storage area for storing an operation unit program 250 for controlling the operation unit board 150 and temporary information.

The microcomputer 151 is connected to a plurality of signal lines to control the hardware components on the operation unit board 150. Specifically, the microcomputer 151 is connected to the reset signal line (/PNL_RST) 152 for receiving a reset request, and the UART reception line (RX) 153 and the UART transmission line (TX) 154 for communication with the controller board 110. Further, the microcomputer 151 is connected to a signal line for detecting the press of the physical key 155 and signal lines for controlling the buzzer 156 and the LED 157. Further, the microcomputer 151 is connected to an operation unit LCD panel power source signal line (/LCD_PON) 160 for controlling a power source of the LCD panel 162 and a backlight control signal line (LCD_PWM) 159 for controlling a backlight of the LCD panel 162.

The physical key 155 is a device configured to read an operation performed on the image forming apparatus 100 by the user. For example, the physical key 155 is configured using a key matrix and is capable of reading a user operation based on a press state thereof.

The operation unit board 150 transmits the type and state of a pressed key as a control command via the UART transmission line (TX) 154. In this way, the user operation on the physical key 155 is transmitted to the controller board 110.

The buzzer 156 is a device for informing the user of information by being turned on/off based on a control command received from the controller board 110 via the UART reception line (RX) 153.

The LED 157 is a device for informing the user of information by being turned on, turned off, or blinking based on a control command received from the controller board 110 via the UART reception line (RX) 153. In the present exemplary embodiment, the LED 157 includes an error LED 158 for informing the user of an error.

The controller board I/F 161 is an interface for communication with the operation unit I/F 120.

The LCD panel 162 is a device for displaying the display image data received via the display image data signal line (LVDS_DATA(LCDC)) 164. The microcomputer 151 controls the supply of power to the LCD panel 162 via the operation unit LCD panel power source signal line (/LCD_PON) 160. The microcomputer 151 also controls the backlight of the LCD panel 162 via the backlight control signal line (LCD_PWM) 159.

The touch sensor 163 is a device for receiving an operation performed on the image forming apparatus 100 by the user. The touch sensor 163 detects information about the position and intensity of a press and transmits the detected information to the controller board I/F 161 via the touch sensor signal line (TOUCH) 167, thereby transmitting the user operation to the controller board 110.

The operation unit board power source I/F 179 is an interface for receiving necessary power for operating the operation unit board 150 from the power source unit 170.

Details of the power source unit 170 will be described below.

The power source unit 170 includes the power source unit seesaw switch 171 and a power supply unit 172. The power source unit seesaw switch 171 is an input unit via which the user inputs an instruction to turn on or off the image forming apparatus 100. The power supply unit 172 is a unit configured to supply power supplied from an electric outlet to the controller board 110, the operation unit board 150, the scanner engine 191, and the printer engine 192.

The controller board 110 receives power from the power supply unit 172 via the power source I/F 149. Further, the operation unit board 150 receives power from the power supply unit 172 via the operation unit board power source I/F 179.

Changes of power states of the operation unit board 150 and the controller board 110 will be described briefly below.

In the present exemplary embodiment, there are three power states, a power-off state, a screen power-saving state, and a screen display state. The power consumption in the power-off state is lower than the power consumption in the screen power-saving state. Further, the power consumption in the screen power-saving state is lower than the power consumption in the screen display state.

The power-off state is a state where no power is supplied to the operation unit board 150. Specifically, the power-off state is a state where a power plug of the image forming apparatus 100 is not connected to an electric outlet or a state where the power plug is connected to an electric outlet but the power source unit seesaw switch 171 is off.

The screen power-saving state is a state where power is supplied to the operation unit board 150 and the microcomputer 151 is operating but no power is supplied to the LCD panel 162.

The screen display state is a state where power is supplied to the operation unit board 150, the microcomputer 151 is operating, power is supplied to the LCD panel 162, and the display image data is displayed.

In a case where a power-on event occurs in the image forming apparatus 100 when the operation unit board 150 and the controller board 110 are in the power-off state, the operation unit board 150 and the controller board 110 are brought into the screen power-saving state. In a case where a screen display event occurs in the image forming apparatus 100 when the operation unit board 150 and the controller board 110 are in the screen power-saving state, the operation unit board 150 and the controller board 110 are brought into the screen display state.

In a case where a screen power-saving event occurs in the image forming apparatus 100 when the operation unit board 150 and the controller board 110 are in the screen display state, the operation unit board 150 and the controller board 110 are brought into the screen power-saving state. In a case where a power-off event occurs in the image forming apparatus 100 when the operation unit board 150 and the controller board 110 are in the screen power-saving state, the operation unit board 150 and the controller board 110 are brought into the power-off state.

When the image forming apparatus 100 is turned on, the operation unit board 150 and the controller board 110 are changed from the power-off state to the screen power-saving state. Once the controller board 110 forms display image data, the controller board 110 transmits a screen display command to the operation unit board 150. If the operation unit board 150 receives the screen display command, the operation unit board 150 is changed from the screen power-saving state to the screen display state and then starts screen display. The controller board 110 is also changed from the screen power-saving state to the screen display state.

Technically, during a period from when the controller board 110 transmits a command for changing the state to the operation unit board 150 to when the controller board 110 receives a command response, there is an interval during which the power states of the controller board 110 and the operation unit board 150 are not the same. The series of operations will be described below with reference to FIGS. 4 and 5.

Figure 2:
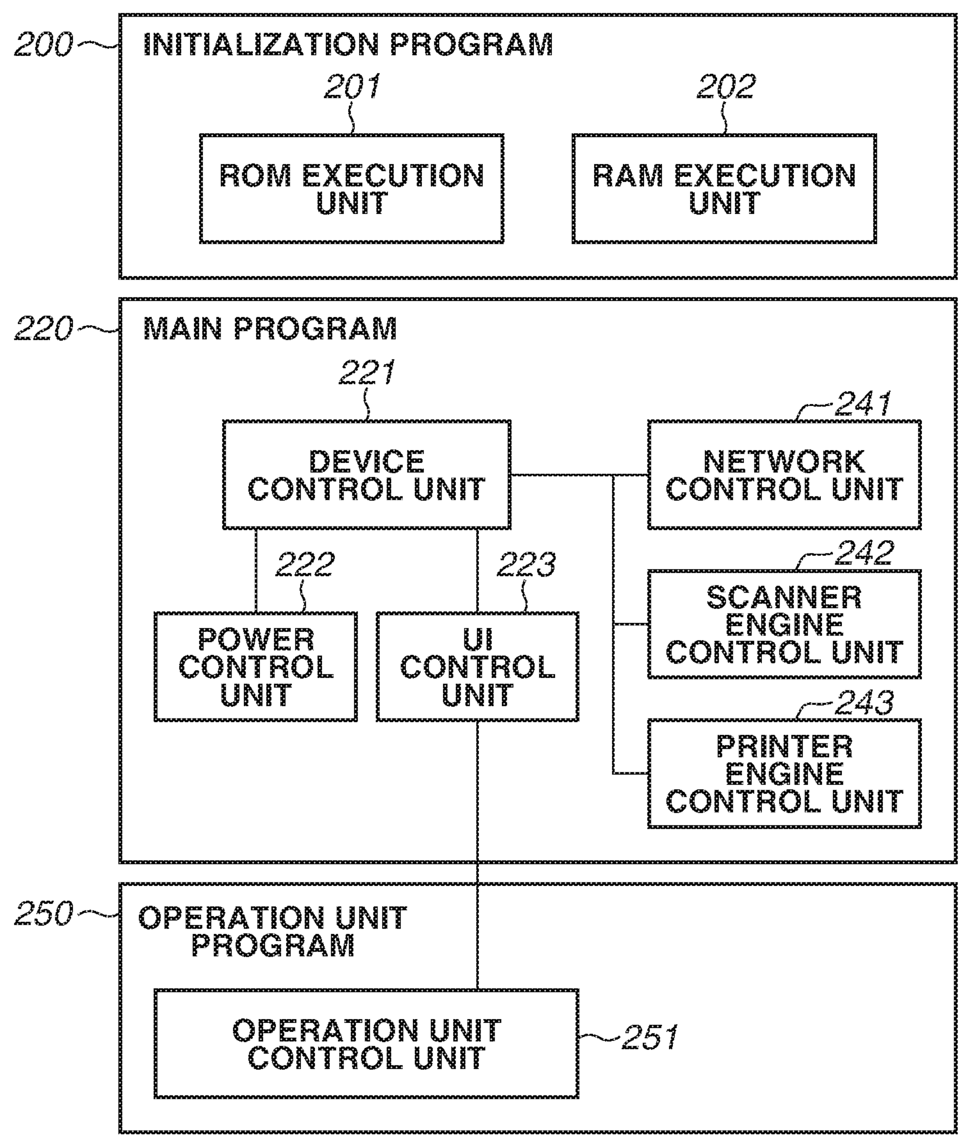
FIG. 2 is a software block diagram illustrating an initialization program, a main program, and an operation unit program.

FIG. 2 is a software block diagram illustrating the initialization program 200 and the main program 220, which are executed on the controller board 110, and the operation unit program 250, which is executed on the operation unit board 150.

The initialization program 200 is a program that is executed immediately after the image forming apparatus 100 is turned on. The initialization program 200 is divided into a ROM execution unit 201 and a RAM execution unit 202.

The ROM execution unit 201 is an initialization processing unit that activates the RAM execution unit 202. The ROM execution unit 201 executes the initialization program 200 using data read from the ROM 113 and a register of the CPU 111 without using the RAM 112.

The RAM execution unit 202 is an initialization processing unit configured to activate the main program 220 after the RAM 112 is initialized. The RAM execution unit 202 is executed using information on a memory on the RAM 112 and/or information on the storage 114 in addition to the data read from the ROM 113 and the register of the CPU 111.

Details of operations of the initialization program 200 will be described below with reference to FIG. 3.

The main program 220 includes a device control unit 221, a power control unit 222, and a user interface (UI) control unit 223. The main program 220 further includes a network control unit 241, a scanner engine control unit 242, and a printer engine control unit 243.

The device control unit 221 is a control unit for controlling the entire image forming apparatus 100. The device control unit 221 schedules the processing to be executed by the image forming apparatus 100.

The power control unit 222 is a control unit for controlling the power of the image forming apparatus 100.

The UI control unit 223 is a control unit for controlling information exchange between the controller board 110 and the operation unit board 150. Details of operations of the UI control unit 223 will be described below with reference to FIG. 4.

The network control unit 241 is a control unit for receiving a communication from an external apparatus connected to the image forming apparatus 100 via a network via the network I/F 143 that serves as a communication unit. In the present disclosure, the communication unit does not have to be a wired network and can be realized using various wireless networks.

The scanner engine control unit 242 is a control unit for controlling the scanner engine 191 via the scanner engine I/F 141.

The printer engine control unit 243 is a control unit for controlling the printer engine 192 via the printer engine I/F 142.

The operation unit program 250, which is executed on the operation unit board 150, includes an operation unit control unit 251.

Details of operations of the operation unit program 250 will be described below with reference to FIG. 5.

The main program 220 can include a page description language (PDL) interpreter unit that interprets PDL data. Further, the main program 220 can include a raster image processor (RIP) unit that forms print image data based on a PDL data interpretation result.

In recent years, there have been image forming apparatuses that can expand its function by adding an application. Since the expandability of the image forming apparatuses is within the range of publicly-known techniques, detailed description thereof is omitted.

Figure 3:
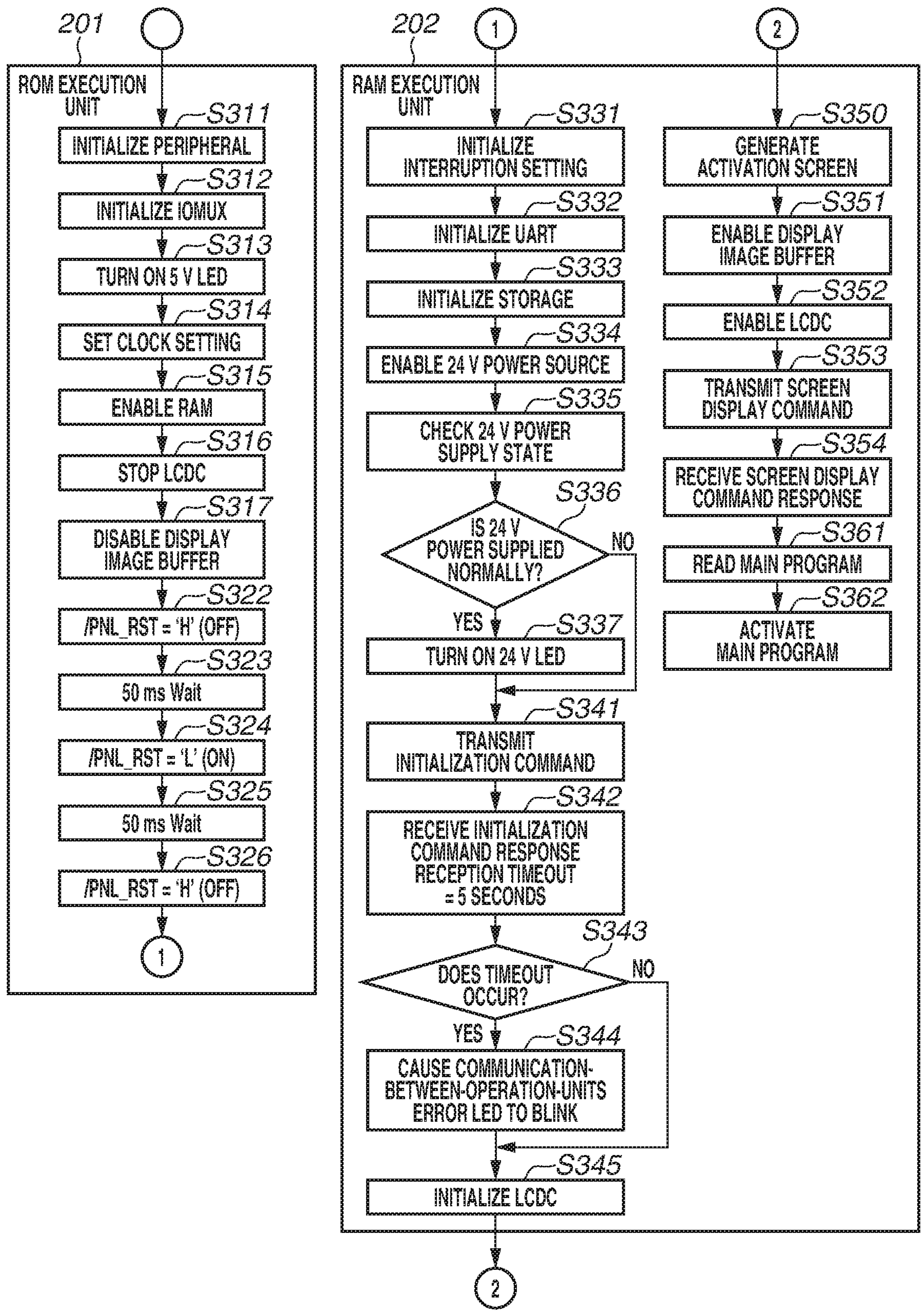
FIG. 3 is a flowchart illustrating a process that is executed by the initialization program.

FIG. 3 is a flowchart that is executed by the initialization program 200.

In the flowchart in FIG. 3, steps S311 to S326 are executed by the ROM execution unit 201. Further, steps S331 to S362 are executed by the RAM execution unit 202.

In step S311, the ROM execution unit 201 initializes each hardware component (peripheral) on the controller board 110. This is to keep the states of the hardware components uniform during activation processing to facilitate state management of the controller board 110.

In step S312, the ROM execution unit 201 initializes input/output (IO) multiplexing (IOMUX) to control interruption and input on the controller board 110. As used herein, IOMUX refers to a function of recombining the input and output assigned to general-purpose inputs/outputs (GPIOs). For example, in a case where the controller boards 110 that are similarly designed are to be used in a plurality of products, a necessary function is realized by recombining the input and output assigned to the GPIOs using IOMUX while minimizing a hardware change.

In step S313, the ROM execution unit 201 turns on the LED (5 V) 116 on the LED 115. Specifically, the ROM execution unit 201 supplies power to the LED 115 using the GPIOs enabled in step S312 to turn on the LED (5 V) 116. In a case where the ROM execution unit 201 completes execution of processing up to step S313, power of 5 V is supplied to the controller board 110 from the power source unit 170, so that the LED 116 (5 V) is turned on, thereby informing the user or the service engineer that operations are performed normally.

In step S314, the ROM execution unit 201 sets a clock setting on the controller board 110. On the controller board 110, there are hardware components that operate at various frequencies. To control the hardware components, the ROM execution unit 201 sets the clock setting.

In step S315, the ROM execution unit 201 initializes the RAM 112 to change to an accessible state.

In step S316, the ROM execution unit 201 controls a register relating to the LCDC 131 and stops the LCDC 131. Immediately after the image forming apparatus 100 is turned on, the LCDC 131 is not initialized or display image data is not transmitted. However, the processing is performed to ensure that the state of the LCDC 131 after the initialization processing is completed is uniform to facilitate state management.

In step S317, the ROM execution unit 201 controls a register relating to the display image buffer 132 and disables the display image buffer 132. The display image buffer 132 is disabled to ensure that the state of the display image buffer 132 is uniform after the initialization processing is completed to facilitate state management, similarly to the processing to stop the LCDC 131.

In step S322, the ROM execution unit 201 sets the /PNL_RST to High (OFF) and cancels the reset state of the microcomputer 151. The initial processing of setting the /PNL_RST to High (OFF) is executed regardless of whether an initial state of the /PNL_RST is High (OFF) or Low (ON) in order to ensure that the microcomputer 151 is reset.

Thereafter, in step S323, the ROM execution unit 201 waits for 50 ms.

The process of controlling the reset state of the microcomputer 151 by the CPU 111 is as described below.

First, the CPU 111 controls the reset signal line (/PNL_RST) 126. If the state of the reset signal line (/PNL_RST) 126 is changed, the state of the reset signal line (/PNL_RST) 152 is changed via the reset signal line of the communication bundle line 181. In this way, the state of the reset signal line (PNL_RST) 152 is changed to control the reset state of the microcomputer 151.

Describing every process similarly to the above description will lead to complication, so that description of the processes is omitted.

There are two reasons for waiting for 50 ms after the ROM execution unit 201 sets the /PNL_RST 126. One of the reasons is that it takes a slight amount of time for the control performed on the /PNL_RST 126 by the ROM execution unit 201 to be reflected to the /PNL_RST 152 via the communication bundle line 181. The other reason is that whenever a signal is changed from High to Low or from Low to High, there exists an interval during which the signal is neither High nor Low.

In order to avoid the effects thereof, ROM execution unit 201 waits for the 50 ms. The ROM execution unit 201 also waits for 50 ms in the control of the /PNL_RST described below for a similar reason.

In step S324, the ROM execution unit 201 sets the /PNL_RST to Low (ON) to change the microcomputer 151 to the reset state.

Thereafter, in step S325, the ROM execution unit 201 waits for 50 ms. In step S326, the ROM execution unit 201 sets the /PNL_RST to High (OFF) to cancel the reset state of the microcomputer 151.

In the processing of steps S322 to S326 described above, the ROM execution unit 201 performs reset control on the microcomputer 151 of the operation unit board 150.

Then, by the execution of the reset control as a trigger, the RAM execution unit 202 starts execution of a malfunction detection sequence.

First, in step S331, the RAM execution unit 202 initializes an interruption setting. The initialization of the interruption setting is performed to ensure that the state after the initialization processing is uniform to facilitate state management, similarly to the above-described processing of stopping the LCDC 131.

In step S332, the RAM execution unit 202 initializes the UART 121. This enables the RAM execution unit 202 to communicate with the operation unit control unit 251 operating on the operation unit board 150.

In step S333, the RAM execution unit 202 initializes the storage 114. To enable access to the storage 114, the RAM execution unit 202 performs necessary clock setting so as to change the state to a state where data stored in the storage 114 can be referenced.

In step S334, the RAM execution unit 202 enables a 24-V power source via the power control line 183.

In step S335, the RAM execution unit 202 checks whether the supply of power of 24 V is performed.

In step S336, the RAM execution unit 202 determines whether the supply of power of 24 V is performed normally and changes the process in the manner described below based on the determination result.

In a case where the supply of power of 24 V is performed normally (YES in step S336), the processing proceeds to step S337. In step S337, the RAM execution unit 202 turns on the LED (24 V) 117 of the LED 115. Specifically, the RAM execution unit 202 supplies power to the LED 115 using the GPIOs enabled in step S312 to turn on the LED (24 V) 117 which indicates the supply of power of 24 V.

On the other hand, in a case where the supply of power of 24 V is not performed normally (NO in step S336), the LED (24 V) 117 is not turned on, and the processing proceeds to step S341.

In step S341, the RAM execution unit 202 transmits an initialization command (1) to the operation unit control unit 251.

In step S342, the RAM execution unit 202 receives an initialization command response (2) from the operation unit control unit 251. The transmission of the initialization command response (2) from the operation unit control unit 251 to the UI control unit 223 is performed in step S506 in a flowchart illustrated in FIG. 5, which will be described below.

In this way, the RAM execution unit 202 establishes communication with the operation unit control unit 251 and detects successful completion of initialization processing. In the receipt of the initialization command response (2), if the initialization command response (2) is not received within a predetermined period of time (five seconds in the present exemplary embodiment), the RAM execution unit 202 determines that a timeout occurs.

If the RAM execution unit 202 transmits the initialization command (1) to the operation unit control unit 251 in step S341, the operation unit control unit 251 receives the initialization command (1) from the UI control unit 223 in step S503 in the flowchart in FIG. 5 described below.

In step S343, the RAM execution unit 202 determines whether a timeout occurs and changes the process based on the determination result.

In a case where a timeout occurs (YES in step S343), the processing proceeds to step S344. In step S344, the RAM execution unit 202 controls the communication-between-operation-units error LED 118 to blink. This informs the user that communication between the controller board 110 and the operation unit board 150 fails.

In step S345, the RAM execution unit 202 controls the register relating to the LCDC 131 and initializes the LCDC 131. In the initialization of the LCDC 131, for example, an address of a location of data to be read on the RAM 112 and width, height, color depth, and format settings of display image data are set. At the time when the initialization processing of the LCDC 131 is executed, the LCDC 131 does not start transmitting display image data.

In step S350, the RAM execution unit 202 generates display image data that indicates an activation screen on the RAM 112.

In step S351, the RAM execution unit 202 controls the register relating to the display image buffer 132 and enables the display image buffer 132.

In step S352, the RAM execution unit 202 controls the register relating to the LCDC 131 and enables the LCDC 131. In this way, the LCDC 131 starts transmitting the display image data to the display image data signal line (LVDS_DATA(LCDC)) 135.

In step S353, the RAM execution unit 202 transmits a screen display command (3) to the operation unit control unit 251.

In step S354, the RAM execution unit 202 receives a screen display command response (4) from the operation unit control unit 251.

Upon the receipt of the screen display command response (4), the RAM execution unit 202 requests the operation unit control unit 251 to prepare for screen display.

By the above-described processing, the LCDC 131 transmits the display image data to the LCD panel 162. The activation screen generated in step S350 is displayed on the LCD panel 162.

In step S361, the RAM execution unit 202 reads the main program 220 from the storage 114 and loads the main program 220 into the RAM 112.

Then, in step S362, the RAM execution unit 202 starts executing the main program 220 loaded into the RAM 112.

By executing the processing illustrated in the flowchart in FIG. 3, the RAM execution unit 202 activates the main program 220.

Figure 4:
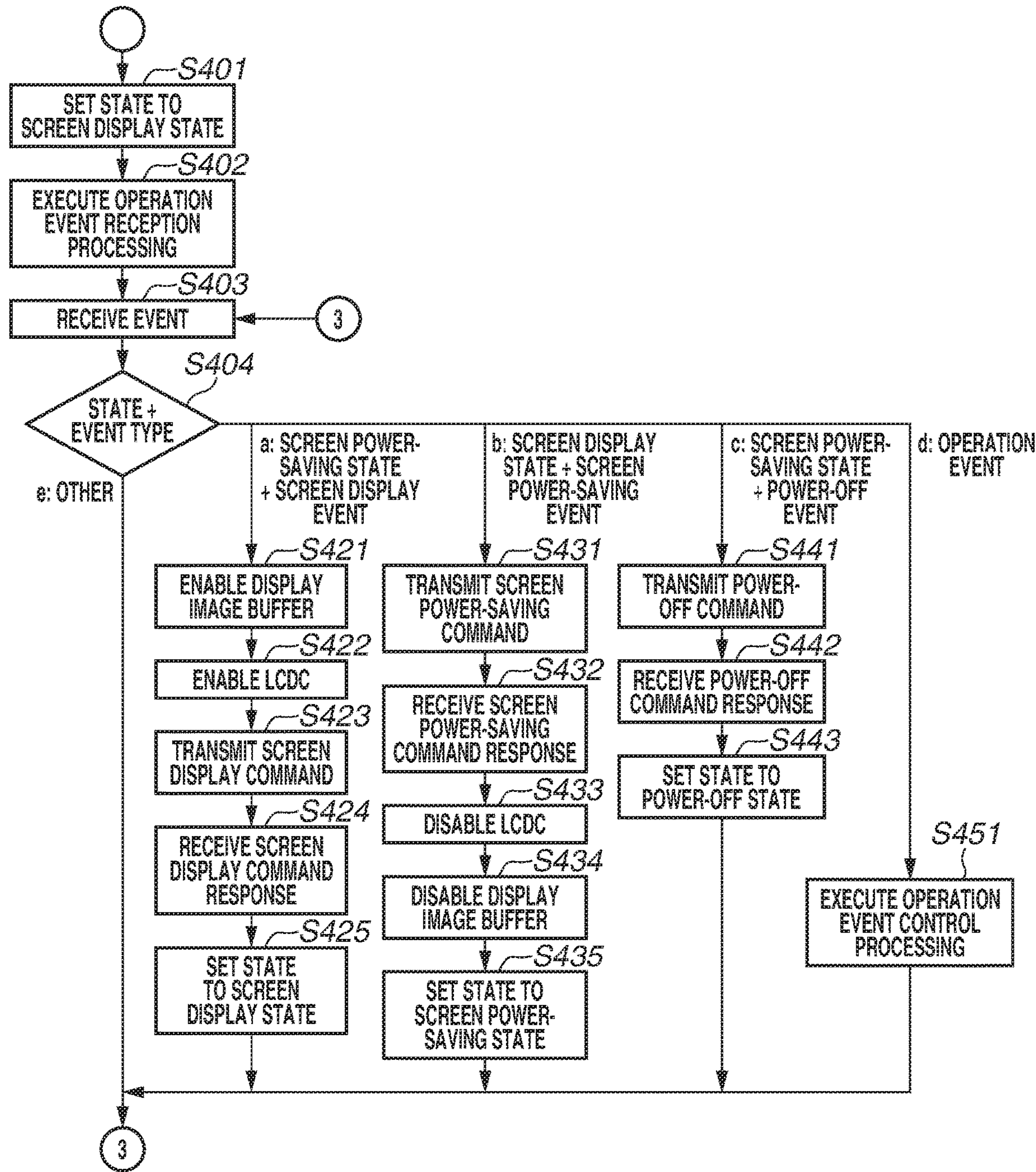
FIG. 4 is a flowchart illustrating a process that is executed by a user interface (UI) control unit.

FIG. 4 is a flowchart illustrating a UI control process that is executed by the UI control unit 223 of the main program 220.

In step S401, the UI control unit 223 sets the state of the UI control unit 223 to the screen display state. This processing is started if the device control unit 221 detects a power-on event and UI control unit 223 is activated after power is supplied to the operation unit board 150 including the microcomputer 151.

In step S402, the UI control unit 223 executes operation event reception processing for receiving an operation event. The operation event is issued at a timing when various sensors of the image forming apparatus 100 detect a user operation.

For example, if the operation unit control unit 251 detects the press of the physical key 155, the operation unit control unit 251 notifies the UI control unit 223 of the detected press as an operation event. Then, the UI control unit 223 moves a thread of transmitting an operation command response of the physical key 155 to the operation unit control unit 251. The UI control unit 223 can register an interruption function applicable to various interruptions in advance and notify the UI control unit 223 of the operation event in the interruption function.

Further, if the power control unit 222 detects the press of the power source unit seesaw switch 171, the power control unit 222 notifies the UI control unit 223 of the detected press as an operation event. If the operation unit control unit 251 detects an operation on the touch sensor 163, the operation unit control unit 251 notifies the UI control unit 223 of the detected operation as an operation event.

A notification of an operation performed on the scanner engine 191 or the printer engine 192 may be provided as an operation event to the UI control unit 223 in some cases. For example, if the scanner engine control unit 242 detects that a pressing plate (not illustrated) of the scanner engine 191 is opened or closed, the scanner engine control unit 242 notifies the UI control unit 223 of the detected operation as an operation event. Similarly, if the printer engine control unit 243 detects that a toner-replacement door (not illustrated) of the printer engine 192 is opened or closed, the printer engine control unit 243 notifies the UI control unit 223 of the detected operation as an operation event.

In step S403, if an operation event is issued from the device control unit 221, the UI control unit 223 receives the operation event.

In step S404, the UI control unit 223 changes the process based on the state of the UI control unit 223 and the received operation event as described below.

In a case where the state of the UI control unit 223 is the screen power-saving state and the received operation event is the screen display event ("a" in step S404), the UI control unit 223 executes the below-described process.

First, in step S421, the UI control unit 223 controls the register relating to the display image buffer 132 and enables the display image buffer 132. In step S422, the UI control unit 223 controls the register relating to the LCDC 131 and enables the LCDC 131. In this way, the LCDC 131 starts transmitting display image data to the display image data signal line (LVDS_DATA(LCDC)) 135.

In step S423, the UI control unit 223 transmits the screen display command (3) to the operation unit control unit 251 to request screen display.

In step S424, the UI control unit 223 receives the screen display command response (4) from the operation unit control unit 251.

In step S425, the UI control unit 223 sets the state of the image forming apparatus 100 to the screen display state.

As described above, in the case where the UI control unit 223 receives the screen display event in the screen power-saving state, the UI control unit 223 executes the process of changing from the screen power-saving state to the screen display state.

If the process with respect to the received event is completed, the processing returns to step S403. Then, if the UI control unit 223 receives a new event again, the UI control unit 223 repeats the process.

In a case where the state of the UI control unit 223 is the screen display state and the received operation event is the screen power-saving event ("b" in step S404), the UI control unit 223 executes the below-described process.

In step S431, the UI control unit 223 transmits a screen power-saving command (5) to the operation unit control unit 251.

In step S432, the UI control unit 223 receives a screen power-saving command response (6) from the operation unit control unit 251.

In this way, the UI control unit 223 detects completion of the screen power-saving processing by the operation unit control unit 251.

In step S433, the UI control unit 223 controls the register relating to the LCDC 131 and disables the LCDC 131. In this way, the LCDC 131 no longer transmits display image data.

In step S434, the UI control unit 223 controls the register relating to the display image buffer 132 and disables the display image buffer 132. This process is to stop the supply of power to the display image buffer 132 in the case where screen display is not performed in order to reduce the power consumption in the screen power-saving state.

In step S435, the UI control unit 223 sets the state of the image forming apparatus 100 to the screen power-saving state.

As described above, in the case where the UI control unit 223 receives the screen power-saving event in the screen display state, the UI control unit 223 executes the process of changing from the screen display state to the screen power-saving state.

If the process with respect to the received event is completed, the processing returns to step S403. Then, if the UI control unit 223 receives a new event again, the UI control unit 223 repeats the process.

Further, in a case where the state of the UI control unit 223 is the screen power-saving state and the received operation event is the power-off event ("c" in step S404), the UI control unit 223 executes the below-described process.

In step S441, the UI control unit 223 transmits a power-off command (5) to the operation unit control unit 251.

In step S442, the UI control unit 223 receives a power-off command response (6) from the operation unit control unit 251.

In step S443, the UI control unit 223 sets the state of the image forming apparatus 100 to the power-off state.

As described above, in the case where the power-off event is received in the screen power-saving state, the UI control unit 223 executes the process of changing from the screen power-saving state to the power-off state.

If the process with respect to the received event is completed, the processing returns to step S403. Then, if the UI control unit 223 receives a new event again, the UI control unit 223 repeats the process.

In a case where the UI control unit 223 receives an operation event ("d" in step S404), then in step S451, the UI control unit 223 provides a notification of the operation event to an application (not illustrated) that is operating on the image forming apparatus 100 and displaying a screen at the time of the reception.

For example, in a case where an application of a copy function or a facsimile function is operating, the operation event is transmitted to the application so that various types of setting are executed on various applications.

If the process with respect to the received event is completed, the processing returns to step S403. Then, if the UI control unit 223 receives a new event again, the UI control unit 223 repeats the process.

In a case where an event other than "a" to "d" is received in step S404 ("e" in step S404), the processing returns to step S403, and the UI control unit 223 prepares for reception of a new event.

FIG. 5 is a flowchart illustrating an operation unit board control process that is executed by the operation unit control unit 251 of the operation unit program 250.

In step S501, the operation unit control unit 251 sets the state of the operation unit board 150 to the power-off state.

In step S502, the operation unit control unit 251 controls the operation unit LCD panel power source signal line (/LCD_PON) 160 and stops the supply of power to the LCD panel 162.

In step S503, the operation unit control unit 251 sets a predetermined period of time (60 seconds in the present exemplary embodiment) as a timeout period and receives the initialization command (1) from the RAM execution unit 202.

In step S580, the operation unit control unit 251 determines whether the initialization command (1) is received within 60 seconds (i.e., whether a timeout occurs) and changes the process based on the determination result.

In a case where the operation unit control unit 251 does not receive the initialization command (1) within 60 seconds (i.e., a timeout occurs) (YES in step S580), then in step S581, the error LED 158 is turned on. In this way, the user is informed that the initialization command (1) is not received within the predetermined period of time.

On the other hand, in a case where the operation unit control unit 251 receives the initialization command (1) within 60 seconds (i.e., no timeout occurs) (NO in step S580), then in step S504, the operation unit control unit 251 controls the backlight control signal line (LCD_PWM) 159 and turns off the backlight of the LCD panel 162.

The transmission of the initialization command (1) from the RAM execution unit 202 to the operation unit control unit 251 is performed in step S341 in the flowchart in FIG. 3.

In step S506, the operation unit control unit 251 transmits the initialization command response (2) to the RAM execution unit 202.

If the operation unit control unit 251 transmits the initialization command response (2) to the RAM execution unit 202, then in step S342 in the flowchart in FIG. 3 described above, the RAM execution unit 202 receives the initialization command response (2).

In step S507, the operation unit control unit 251 sets the state of the operation unit board 150 to the screen power-saving state.

As described above, the operation unit control unit 251 executes the process of changing from the power-off state to the screen power-saving state.

In step S508, the operation unit control unit 251 receives a control command from the UI control unit 223. In step S509, the operation unit control unit 251 changes the process based on the state of the operation unit board 150 and the type of the received control command.

In a case where a control command is not received within a predetermined period of time ("a" in step S509), the operation unit control unit 251 determines that a timeout occurs.

Then in step S599, the operation unit control unit 251 executes physical key control processing. Specifically, the operation unit control unit 251 detects the press state of the physical key 155 and executes physical key control processing.

In the physical key control processing, specifically, the operation unit control unit 251 detects the press state of the physical key 155 using a key matrix and detects a change in the press state. In a case where a change in the press state is detected, the operation unit control unit 251 transmits a physical key press command (15) to the UI control unit 223. Then, the operation unit control unit 251 receives a physical key press command response (16) from the UI control unit 223.

On the other hand, in a case where a change in the press state is not detected, the operation unit control unit 251 immediately executes the next processing without transmitting the physical key press command (15) or receiving the physical key press command response (16). Description of the processing of detecting the press state of the physical key 155 is omitted because this is not an essential part of the present disclosure.

After the physical key control processing, the processing returns to step S508, and the operation unit control unit 251 receives a new control command again and repeats the process.

In a case where a combination of the state of the operation unit board 150 and the received control command are not an expected combination ("b" in step S509), then in step S510, the operation unit control unit 251 transmits a command error response.

Then, in step S599, if the processing with respect to the received control command is completed, the operation unit control unit 251 executes physical key control processing.

After the physical key control processing, the processing returns to step S508, and the operation unit control unit 251 receives a new control command again and repeats the process.

Further, in a case where the state of the operation unit board 150 is the screen power-saving state and the screen display command (3) is received ("c" in step S509), the operation unit control unit 251 executes the below-described process.

In step S511, the operation unit control unit 251 controls the operation unit LCD panel power source signal line (/LCD_PON) 160 to start supplying power to the LCD panel 162.

In step S512, the operation unit control unit 251 controls the backlight control signal line (LCD_PWM) 159 to turn on the backlight of the LCD panel 162.

In step S514, the operation unit control unit 251 transmits the screen display command response (4) to the UI control unit 223.

In step S515, the operation unit control unit 251 sets the state of the operation unit board 150 to the screen display state.

As described above, the operation unit control unit 251 executes the process of changing from the screen power-saving state to the screen display state.

Then, in step S599, if the processing with respect to the received control command is completed, the operation unit control unit 251 executes physical key control processing.

After the physical key control processing, the processing returns to step S508, and the operation unit control unit 251 receives a new control command again and repeats the process.

In a case where the state of the operation unit board 150 is the screen display state and the screen power-saving command (5) is received ("d" in step S509), the operation unit control unit 251 executes the below-described process.

In step S541, the operation unit control unit 251 controls the backlight control signal line (LCD_PWM) 159 to turn off the backlight of the LCD panel 162.

Thereafter, in step S542, the operation unit control unit 251 waits for 1 ms.

In step S545, the operation unit control unit 251 controls the operation unit LCD panel power source signal line (/LCD_PON) 160 to stop the supply of power to the LCD panel 162.

In step S546, the operation unit control unit 251 transmits the screen power-saving command response (6) to the UI control unit 223.

In step S547, the operation unit control unit 251 sets the state of the operation unit board 150 to the screen power-saving state.

As described above, the operation unit control unit 251 executes the process of changing from the screen display state to the screen power-saving state.

Then, in step S599, if the processing with respect to the received control command is completed, the operation unit control unit 251 executes physical key control processing.

After the physical key control processing, the processing returns to step S508, and the operation unit control unit 251 receives a new control command again and repeats the process.

Further, in a case where a LED control command such as a LED turn-on command (9) or a LED turn-off command (11) is received ("e" in step S509), the operation unit control unit 251 executes the below-described process. In step S551, the operation unit control unit 251 controls the LED 157 based on a LED control instruction described in the LED turn-on command (9) or the LED turn-off command (11).

In step S552, the operation unit control unit 251 transmits a LED turn-on command response (10) or a LED turn-off command response (12) to the UI control unit 223.

Then, in step S599, if the processing with respect to the received control command is completed, the operation unit control unit 251 executes physical key control processing.

After the physical key control processing, the processing returns to step S508, and the operation unit control unit 251 receives a new control command again and repeats the process.

Further, in a case where a buzzer sound command (13) is received ("f", in step S509), the operation unit control unit 251 executes the below-described process.

In step S561, the operation unit control unit 251 controls the buzzer 156 based on a buzzer control instruction described in the buzzer sound command (13).

In step S562, the operation unit control unit 251 transmits a buzzer sound command response (14) to the UI control unit 223.

Then, in step S599, if the processing with respect to the received control command is completed, the operation unit control unit 251 executes physical key control processing.

After the physical key control processing, the processing returns to step S508, and the operation unit control unit 251 receives a new control command again and repeats the process.

Further, in a case where the state of the operation unit board 150 is the power-saving state and an end command (7) is received ("g" in step S509), the operation unit control unit 251 executes the below-described process.

In step S571, the operation unit control unit 251 transmits an end command response (8) to the UI control unit 223.

In step S572, the operation unit control unit 251 sets the state of the operation unit board 150 to the power-off state.

As described above, the operation unit control unit 251 executes the process of changing from the screen power-saving state to the power-off state.

Only in the case where the state of the operation unit board 150 is the power-saving state and the end command (7) is received ("g" in step S509), the operation unit control unit 251 ends the operation unit board control process and does not receive a new control command thereafter.

An additional description is given of the changes of the power states of the controller board 110 and the operation unit board 150.

A case where the controller board 110 and the operation unit board 150 are in the screen power-saving state and the screen display event is received will be considered. In this case, the changes of the power states are as described below.

(1) In step S423, the UI control unit 223 transmits a screen display command to the operation unit control unit 251.

(2) If the operation unit control unit 251 receives the screen display command in step S508, the operation unit control unit 251 transmits a screen display command response to the UI control unit 223 in step S514. In step S515, the operation unit control unit 251 changes the state of the operation unit board 150 to the screen display state.

(3) If the UI control unit 223 receives the screen display command response in step S424, the UI control unit 223 changes the state of the controller board 110 to the screen display state in step S425.

In other words, if the operation unit control unit 251 transmits the screen display command response in in step S514, the operation unit control unit 251 automatically changes the state of the operation unit board 150 to the screen display state in step S515.

Meanwhile, the UI control unit 223 is brought into the screen display state after the reception of the screen display command response is completed in step S425.

Thus, there is an interval during which the power states of the controller board 110 and the operation unit board 150 are not the same. This interval, however, is a very short period of time, so that it can be considered that the power states of the controller board 110 and the operation unit board 150 are substantially synchronized.

Effects of the present exemplary embodiment will be described below with reference to Table 2. Table 2 shows the states of the hardware components of the controller board 110 and the operation unit board 150 and information to be provided based on the states. In Table 2, the symbol "-" indicates that the result is the same regardless of whether the state is normal or abnormal.

Each combination of a state and information described in Table 2 is a mere example in the present exemplary embodiment. For example, different blink intervals of the LEDs can be used depending on the combination, or the LEDs can be turned on instead of causing the LEDs to blink. Further, a LED capable of emitting a plurality of colors can be used to increase the amount of information that can be provided using the colors. Further, a method other than an optical method can be used in place of the LEDs, e.g., a buzzer or a melody integrated circuit (IC), to inform the user or the service engineer of an error state.

TABLE 2

| | State | | | | | Information to be Provided | | |
|---|---|---|---|---|---|---|---|---|
| | | | | | | Controller Board 110 Communication | Operation Unit Board 150 | |
| No. | ROM | /PNL_RST | RAM/Storage | TX | RX | Error LED 118 | LCD panel 162 | Error LED 158 |
| 1 | Normal | Normal | Normal | Normal | Normal | Off | Displayed | Off |
| 2 | Normal | Normal | Normal | Normal | Abnormal | Blink | Not Displayed | Off |
| 3 | Normal | Normal | Normal | Abnormal | — | Blink | Not Displayed | Blink |
| 4 | Normal | Normal | Abnormal | — | — | Off | Not Displayed | Blink |
| 5 | Normal | Abnormal | Normal | — | — | Blink | Not Displayed | Off |
| 6 | Normal | Abnormal | Abnormal | — | — | Off | Not Displayed | Off |
| 7 | Abnormal | Abnormal | — | — | — | Off | Not Displayed | Off |

The states of these components indicated by "ROM", "/PNL_RST", "RAM/storage", "TX", and "RX" are targeted to indicate the state of the operation unit board 150.

"ROM" indicates the state of the ROM 113. Specifically, whether the ROM execution unit 201 in the initialization program 200 is executed normally is specified.

"/PNL_RST" indicates the communication line states of the reset signal line (/PNL_RST) 126 and the reset signal line (/PNL_RST) 152.

"RAM/storage" indicates the states of the RAM 112 and the storage 114. Specifically, it indicates whether the RAM execution unit 202 in the initialization program 200 can be executed normally. It further indicates whether the main program 220 has been read from the storage 114 and loaded into the RAM 112 normally.

"TX" indicates the states of a UART transmission line (TX) 122, the UART transmission line (TX) 123, and the UART reception line (RX) 153.

"RX" indicates the states of the UART reception line (RX) 124, the UART reception line (RX) 125, and the UART transmission line (TX) 154.

The information to be provided is roughly divided into information provided by an informing unit on the controller board 110 and information provided by an informing unit on the operation unit board 150.

The informing unit on the controller board 110 includes the communication-between-operation-units error LED 118. The communication-between-operation-units error LED 118 is an informing unit configured to inform the user or the service engineer that communication between the controller board 110 and the operation unit board 150 cannot be executed normally.

The informing unit on the operation unit board 150 includes the LCD panel 162 and the error LED 158.

The LCD panel 162 is an informing unit configured to display the display image data to inform the user or the service engineer that screen display can be executed normally. The error LED 158 is an informing unit configured to inform the user or the service engineer that communication between the controller board 110 and the operation unit board 150 cannot be executed normally.

Each state specified in Table 2 will be described below.

Item No. 1 indicates a case where every component is in a normal state.

In this case, the communication-between-operation-units error LED 118 is turned off, and display image data is displayed on the LCD panel 162, and the error LED 158 is turned off.

Item No. 2 indicates a case where an abnormality occurs in "RX".

In this case, the RAM execution unit 202 fails to receive the initialization command response in step S342 and a timeout occurs, so that the communication-between-operation-units error LED 118 is caused to blink in step S344.

The RAM execution unit 202 also fails to receive the screen display command response in step S354 and is not able to execute the subsequent steps, so that nothing is displayed on the LCD panel 162.

Item No. 3 indicates a case where an abnormality occurs in "TX".

In this case, the RAM execution unit 202 transmits the initialization command in step S341. However, when an abnormality occurs in "TX", the operation unit control unit 251 cannot receive the initialization command in step S503 and a timeout occurs, so that the error LED 158 is caused to blink in step S581. As a result, the operation unit control unit 251 does not transmit an initialization command response in step S506.

Further, the RAM execution unit 202 cannot receive the initialization command response in step S342 and a timeout occurs, so that the communication-between-operation-units error LED 118 is caused to blink in step S344.

Further, the RAM execution unit 202 cannot receive the screen display command response in step S354 or execute the subsequent steps, so that nothing is displayed on the LCD panel 162.

Item No. 4 indicates a case where an abnormality occurs in "RAM/storage".

In this case, the ROM execution unit 201 initializes the RAM 112 in step S315. However, in a case where the RAM execution unit 202 is not normally activated and operated, the processing of the RAM execution unit 202 is not executed. In other words, the RAM execution unit 202 cannot transmit the initialization command in step S341. Thus, the operation unit control unit 251 cannot receive the initialization command in step S503 and it is determined that a timeout occurs, and the error LED 158 is caused to blink in step S581.

Item No. 5 indicates a case where an abnormality occurs in "/PNL_RST".

In this case, even if the ROM execution unit 201 controls the reset signals in steps S322, S324, and S326, no notification is transmitted to the operation unit board 150, so that the operation unit control unit 251 cannot execute step S501 and the subsequent steps. Although the RAM execution unit 202 transmits the initialization command in step S341, a timeout always occurs in the time of receiving the initialization command response in step S342. As a result, the communication-between-operation-units error LED 118 is caused to blink in step S344.

Item No. 6 indicates a case where an abnormality occurs in both "/PNL_RST" and "RAM/storage".

In this case, although the ROM execution unit 201 controls the reset signals in steps S322, S324, and S326, the operation unit control unit 251 cannot execute step S501 and the subsequent steps due to the abnormality in the RAM execution unit 202.

Further, the ROM execution unit 201 initializes the RAM 112 in step S315. In a case where the RAM execution unit 202 is not normally activated and operated, however, the RAM execution unit 202 cannot transmit the initialization command in step S341 or receive the initialization command response in step S342. Thus, the communication-between-operation-units error LED 118 is brought into a turned-off state without blinking in step S344, and the error LED 158 is also brought into the turned-off state.

Item No. 7 indicates a case where the content of the initialization program 200 stored in the ROM 113 is damaged or a case where the ROM 113 malfunctions and activation of the initialization program 200 fails.

In this case, since the ROM execution unit 201 is not activated, the RAM execution unit 202 is also not activated. The operation unit program 250 is not activated as well. Thus, this is the same situation as a situation where no power is supplied.

In Item Nos. 6 and 7, the pieces of information to be provided are the same. In these cases, however, one of the ROM and the RAM/storage malfunctions, and the controller board 110 needs to be replaced. Although the pieces of information to be provided are the same, no practical issue arises.

As described above, according to the present exemplary embodiment, even if an abnormality occurs in the RAM 112 or the storage 114 on the controller board 110, the informing unit on the operation unit board 150 informs the user or the service engineer of the occurrence of the abnormality. At this time, a self-diagnosis function can be realized by software without providing a self-diagnosis unit that operates independently of the controller board 110, so that the self-diagnosis function can be realized without an increase in hardware costs.

Further, according to the present exemplary embodiment, malfunction detection can be realized by changing a software sequence without adding special hardware or wiring. Specifically, in a case where a malfunction occurs in a signal line that is normally used for screen display, a conventional technique requires another signal line in order for a controller board to notify an operation unit board of the occurrence of the malfunction.

On the contrary, according to the present exemplary embodiment, malfunction detection and notification of the occurrence of the malfunction can be realized using only a signal line that is normally used for screen display without any other signal line. In this way, malfunction detection and notification of the occurrence of the malfunction can realized without causing an increase in hardware costs.

Further, according to the present exemplary embodiment, not only the controller board 110 but also the operation unit board 150 can perform malfunction detection. In a common conventional technique, a controller board performs malfunction detection and notifies an operation unit board of an occurrence of a malfunction so that the operation unit board displays the occurrence of the malfunction. In this form, however, a unit that informs the user is lost in a case where a malfunction occurs in communication between the controller board and the operation unit board.

On the contrary, according to the present exemplary embodiment, the operation unit board 150 includes the malfunction detection function independently of the malfunction detection function of the controller board 110. Furthermore, according to the present exemplary embodiment, each board that performs malfunction detection includes the malfunction informing unit. This allows the user or the service engineer to be informed of occurrence of a malfunction even in a state where the controller board 110 is not completely normally activated.

Further, according to the present exemplary embodiment, the malfunction detection unit is realized by the cooperation between the ROM execution unit 201 and the RAM execution unit 202. In a conventional technique, it is common to execute a complicated program in which the ROM execution unit 201 initializes various hardware components implemented on the controller board and the RAM execution unit 202 determines whether a malfunction has occurred.

On the contrary, according to the present exemplary embodiment, the ROM execution unit 201 also plays the role as a trigger to start malfunction detection by the operation unit control unit 251. In this way, even if an abnormality occurs and the RAM execution unit 202 is inoperable, informing the user or the service engineer of the abnormality is executable to that extent that the ROM execution unit 201 is operable.

A second exemplary embodiment will be described below. In the first exemplary embodiment, the malfunction detection sequence including the transmission of an initialization command and the reception of an initialization command response is triggered by the reset control on the microcomputer 151 by the controller board 110.

Such a sequence as in the first exemplary embodiment can be also executed based on a different trigger other than the reset control on the microcomputer 151.

For example, execution of the sequence can be triggered by a start of supply of power to the operation unit board 150. Execution of the sequence can be also triggered by a signal line other than the signal line for performing the reset control on the microcomputer 151.

Alternatively, the sequence can be performed by transmitting an initialization command from the operation unit board 150 and transmitting an initialization command response from the controller board 110 after the controller board 110 performs reset control on the operation unit board 150.

Specifically, the transmission and reception of a control command after reset control is performed on the operation unit board 150 can be respectively executed either by the controller board 110 and the operation unit board 150, or by the operation unit board 150 and the controller board 110.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-010155, filed Jan. 24, 2019, which is hereby incorporated by reference herein in its entirety.

What is claimed is:

1. An information processing apparatus comprising:

a first substrate;

a second substrate;

communication lines configured to communicably connect the first substrate and the second substrate, wherein the first substrate transmits a first signal to the second substrate and then a first command via the communication lines, and the second substrate transmits a response to the first command to the first substrate via the communication lines;

a first notification unit configured to notify a status of the first substrate if the second substrate does not receive the first command within a predetermined period after receiving the first signal transmitted from the first substrate; and a second notification unit configured to notify a status of the second substrate if the first substrate does not receive the response to the first command within another predetermined period after transmitting the first command.

2. The information processing apparatus according to claim 1, further comprising a display unit, wherein the second substrate includes a controller configured to display an image on the display unit.

3. The information processing apparatus according to claim 2, wherein the first substrate transmits display data to the second substrate via the communication line, and the controller displays the image on the display unit based on the received display data.

4. The information processing apparatus according to claim 1, further comprising a first light emitting unit, wherein if the second substrate does not receive the first command within the predetermined period after receiving the first signal, the first notification unit brings the first light emitting unit into a predetermined light emitting state.

5. The information processing apparatus according to claim 4, wherein the predetermined light emitting state is a blinking state.

6. The information processing apparatus according to claim 1, further comprising a second light emitting unit, wherein if the first substrate does not receive the response to the first command within the other predetermined period after transmitting the first command, the second notification unit brings the second light emitting unit into a predetermined light emitting state.

7. The information processing apparatus according to claim 6, wherein the predetermined light emitting state is a blinking state.

8. The information processing apparatus according to claim 1, wherein the first substrate transmits a reset signal, as the first signal, for resetting the second substrate via the communication line.

9. The information processing apparatus according to claim 8, wherein the first substrate transmits the reset signal and thereafter transmits initialization command as the first command.

10. The information processing apparatus according to claim 1, further comprising:

a display unit; and a detection unit configured to detect a user operation on the display unit, wherein the communication lines transmits information about the user operation detected by the detection unit to the first substrate.

11. The information processing apparatus according to claim 1, wherein the first notification unit is a first buzzer, and wherein the first buzzer outputs a sound as the status of the first substrate.

12. The information processing apparatus according to claim 1, wherein the second notification unit is a second buzzer, and wherein the second buzzer outputs a sound as the status of the second substrate.

13. The information processing apparatus according to claim 1, further comprising a printer unit configured to print an image on a recording medium.

14. The information processing apparatus according to claim 1, further comprising a scanner unit configured to scan an image of a document.

15. A method of controlling an information processing apparatus that includes a first substrate, a second substrate, and a communication lines configured to communicably connect the first substrate and the second substrate, the method comprising:

transmitting a first signal from the first substrate to the second substrate via the communication lines;

transmitting a first command from the first substrate to the second substrate via the communication lines;

notifying a status of the first substrate if the second substrate does not receive the first command within a predetermined period after receiving the first signal;

transmitting a response to the first command from the second substrate to the first substrate via the communication lines; and notifying a status of the second substrate if the first substrate does not receive the response to the first command within another predetermined period after transmitting the first command.

* * * * *